April 3, 1951  J. LOMBARDO  2,547,223
APPARATUS FOR REFINISHING FLOORS
Filed May 13, 1946  3 Sheets-Sheet 1
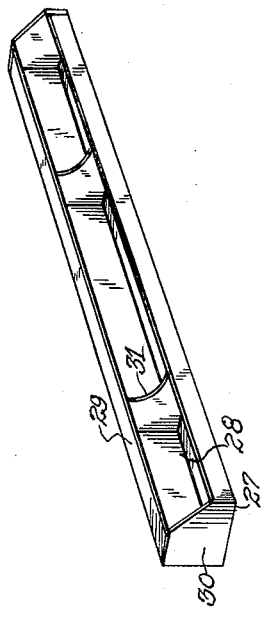
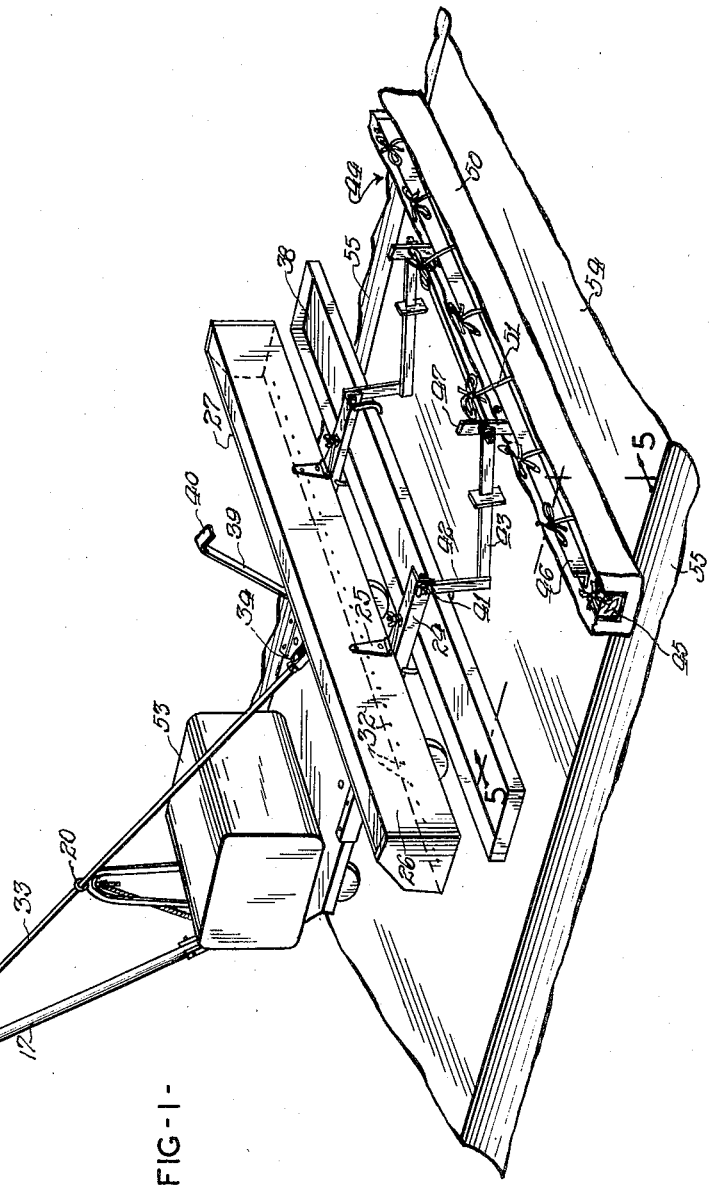
INVENTOR:
JOSEPH LOMBARDO
BY *Henry Heah*
ATTY.

April 3, 1951  J. LOMBARDO  2,547,223
APPARATUS FOR REFINISHING FLOORS
Filed May 13, 1946  3 Sheets-Sheet 2
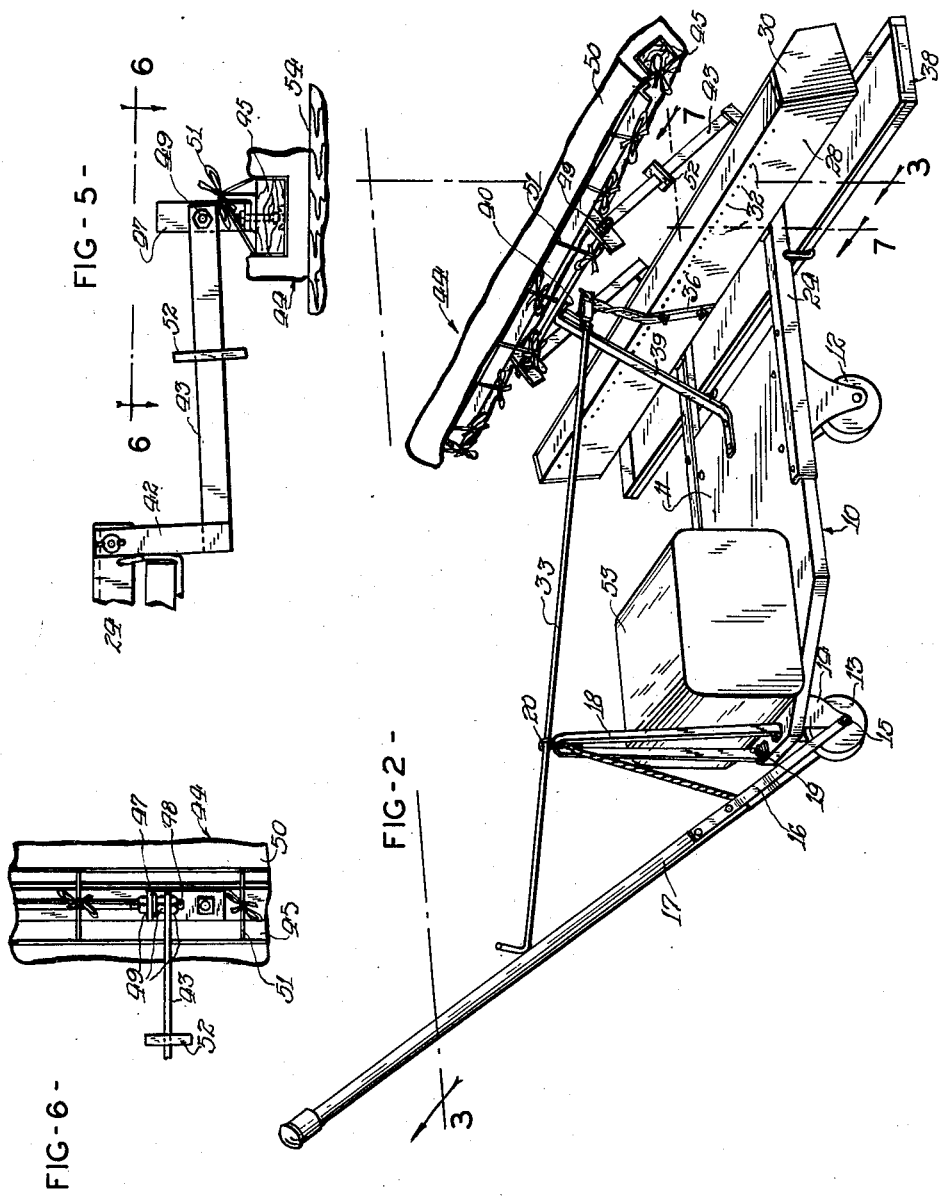
INVENTOR:
JOSEPH LOMBARDO
BY  ATTY.

April 3, 1951          J. LOMBARDO          2,547,223
APPARATUS FOR REFINISHING FLOORS
Filed May 13, 1946          3 Sheets-Sheet 3
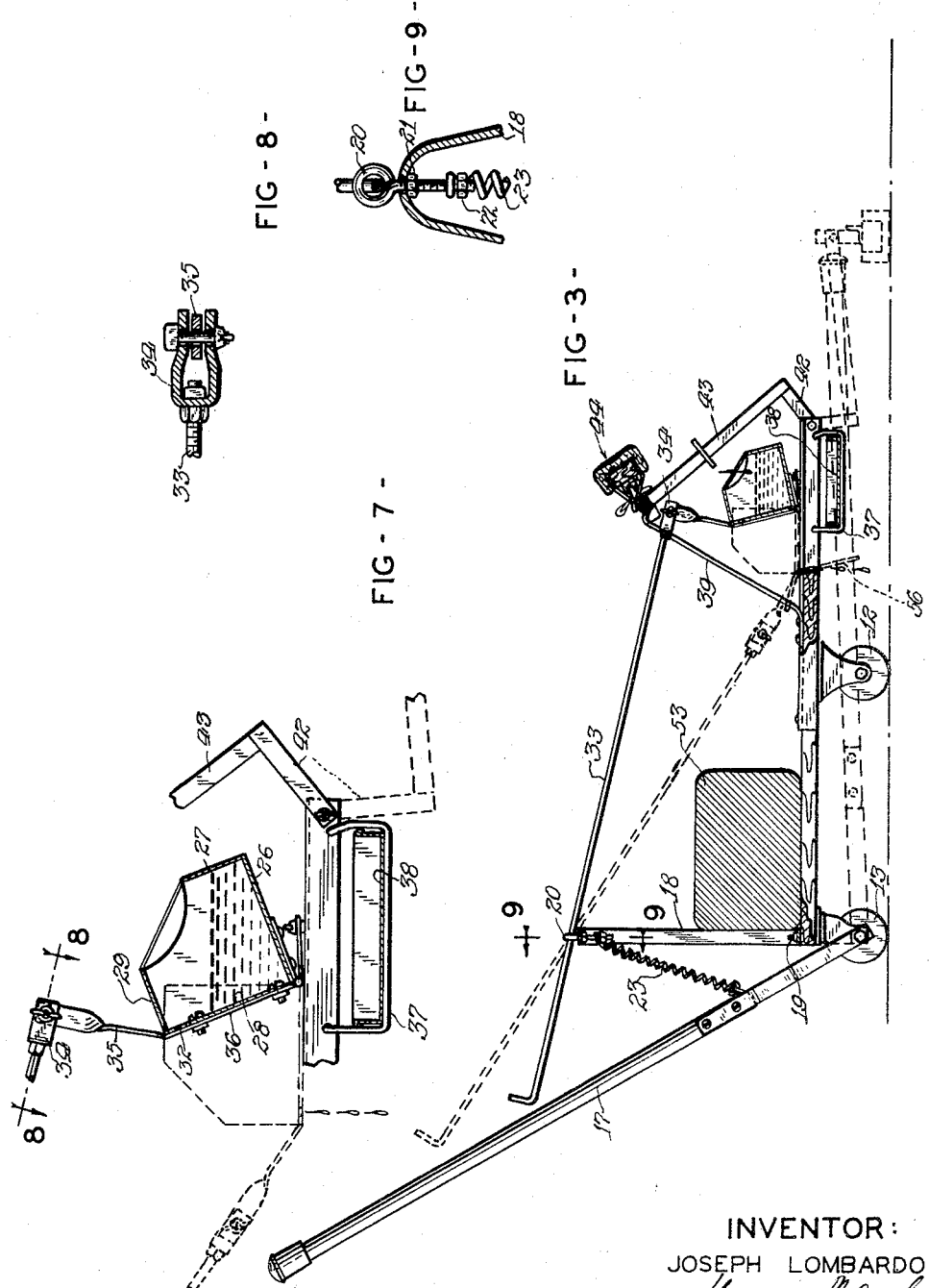
INVENTOR:
JOSEPH LOMBARDO
BY    Henry Olech    ATTY.

Patented Apr. 3, 1951

2,547,223

UNITED STATES PATENT OFFICE 2,547,223

APPARATUS FOR REFINISHING FLOORS

Joseph Lombardo, Chicago, Ill.

Application May 13, 1946, Serial No. 669,269

9 Claims. (Cl. 91—25)

The invention relates to an apparatus for finishing floors.

The refinishing of floors hitherto has been effected by a laborious and toilsome process of manually brushing the floor.

It is, therefore, one of the main objects to provide an apparatus which enables the refinishing of floors in a convenient and less arduous manner than heretofore possible.

It is a further object to provide a tank containing the finishing material which is movably mounted to assume flow position and idle position.

Another object constitutes the provision of independent actuating means for moving the tank selectively into operative and idle positions.

It is a further object to provide the refinishing apparatus on a truck and obtain the refinishing automatically by pulling the truck over the desired floor area.

Another object embraces the provision of a spreader arm or bar capable of being arranged in operative and idle position, respectively.

It is a still further object to provide means to deflect drippings from the spreader bar when in idle position into the tank.

It is also an object to provide certain features of construction and arrangement of parts tending to enhance the utility and efficiency of an apparatus of the kind specified.

With these and other objects in view which will become apparent from a perusal of the invention, the latter comprises the means described in the following specification, particularly pointed out in the claims forming a part thereof and illustrated in the accompanying drawings, in which Fig. 1 is a perspective view of the apparatus constructed in accordance with my invention.

Fig. 2 is a further perspective view showing the apparatus in idle position.

Fig. 3 is a section on the line 3—3 of Fig. 2.

Fig. 4 is a perspective view of a tank employed with the apparatus.

Fig. 5 is a section on the line 5—5 of Fig. 1.

Fig. 6 is a top plan view from the line 6—6 of Fig. 5.

Fig. 7 is a section on the line 7—7 of Fig. 2.

Fig. 8 is a detail section on the line 8—8 of Fig. 7, and

Fig. 9 is a detail section on the line 9—9 of Fig. 3.

Referring to the several views of the drawings 10 generally designates a truck comprising a platform 11 having a pair of casters 12 rigidly secured to the underside of the platform and a swivel caster 13 secured at the front to the underside of said platform by a drop bearing 14, as will be readily understood. To the axle 15 of the caster 14 are pivotally secured two bars 16 between which the lower end of a tongue 17 is secured.

A bar 18 bent into substantially triangular shape to provide a stand, the ends of the bar being bent inwardly and secured to the platform by screws 19.

An eyebolt 20 (Fig. 9) passes through an aperture in the upper end of the stand. A retaining nut 21 secures the bolt in position. A nut 22 at the lower end of the bolt secures the upper end of a coil spring 23 to the bolt and the lower end of the spring is secured to the tongue 17 so that the latter is maintained in raised position for convenient grasp thereof.

To the sides of the platform are secured angle irons 24 which extend beyond the rear end of the truck.

Hinge leaves 25 are secured to the angle irons and to the rear wall 26 of a tank 27 extending transversely beyond the angle irons 24.

The tank 27 has a bottom wall 28 a short low front wall 29 and end walls 30.

The tank is subdivided into three compartments by partitions 31 which partitions have concave upper edges.

The bottom wall 28 has a row of apertures 32 through which the liquid material egresses under gravity when the tank is in operative position (Fig. 1). If, however, the tank is in idle position, as shown in full lines in Fig. 3, then the liquid is trapped in the tank and does not flow.

The tank by reason of its hinge connection is tilted by a rod 33 passing through the eye of bolt 20 and secured at its other end to a clevis 34 to which is secured the bent end 35 of a bar 36 secured to the bottom of the tank.

It is evident that upon pulling of the rod the tank will occupy the operative or flow position and upon pushing the rod inwardly the tank is placed in idle position.

Wire loops 37 are secured to the angle irons 24 and support a drip pan 38 which is underneath the tank 27 and collects any drippings from the tank.

A bar 39 is secured at its lower end to the platform and has an inclined position to terminate at its upper end in a flange 40.

To the rear end of each angle iron 24 is secured by a wingnut 41 for pivotal movement a bar 42 to which is braced or otherwise rigidly secured and at right angles thereto another bar 43.

A surfacing member or means includes a spreader arm or bar generally designated by 44 comprises a beam 45 preferably though not necessarily of rectangular cross section extending parallel to the tank.

On top of the beam is secured an angle iron 46 and two vertical bars 47 are secured to the angle irons and serve as attachment means for the bars 43 which are secured to the bars 47 by a bolt 48 and nuts 49 constituting a lock joint and enabling adjustment of the beam to compensate for uneven floor levels.

Around the beam 45 are wrapped skins 50 and tied together by strings 51.

In the first use of the apparatus the drip pan 38 is placed underneath the spreader bar and filled with shellac lacquer or other preferred liquid material. The spreader bar is then placed in the pan. The skins will soak up most of the material. Then the spreader arm is manually raised, the pan withdrawn and placed in the wire loops.

The spreader bar 44 can only be raised until it contacts with the stop bar 39 (Fig. 3) in which position it overlies the tank 27.

The bars 43 are provided with disks or plates 52 capable of deflecting drippings from the spreader bar into the tank.

In emptying the tank the latter after removal from the angle iron is placed on the edge of one end wall 30 and in lifting the tank the content of the topmost compartment will first flow in the next compartment by reason of the concave edge of partition 31 and then the lowest compartment for final ejection in the continued lifting or tilting of the tank.

In order to counterbalance the truck a weight 53 is provided which may be a container housing the liquid material.

In use the apparatus is unfolded for operative purposes as indicated in Fig. 1 for working or treating a surface such as the floor 54.

If, by way of example, a bowling alley is to be refinished the apparatus is pulled centrally thereof with the spreader bar 44 in lowered or working position on, and extending slightly beyond, the alley 54 and terminating over the gutters 55.

The finishing material is discharged from the tank 27 through the apertures 32 and in pulling the truck by its tongue 17 the spreader bar or arm applies a smooth thin coat to the alley floor.

After use the rod 33 is pushed to cause the tank to occupy the position shown in Fig. 3 and the spreader bar 44 is lifted to abut with the stop bar 39. In this position the spreader bar, tank and drip pan overlie one another so that any drippings are caught in the pan.

If desired the tongue 17 may be disengaged from the spring 23 and turned to underlie the platform to be secured thereto by string 56.

The apparatus eliminates the necessity of refinishing floors by manually applying a brush, is capable of adjustment to meet special requirements and may be employed wherever flooring is to be refinished.

While the drawings disclose one embodiment of the invention, numerous changes and alterations may be made without departing from the spirit of the invention.

I claim:

1. Floor treating apparatus comprising a truck, an elongated discharge tank for treating material carried by said truck beyond a side thereof to overly the floor and discharge said material thereon, an elongated spreader arm and means carried by the truck and mounting said arm to swing in parallelism with said tank from a working position on said floor to an idle position above said tank, and drip receiving means carried by said truck in a position to underly said spreader arm in said idle position.

2. Floor finishing apparatus comprising a truck, an elongated tank carried by said truck and adapted to discharge finishing material onto the floor, an elongated spreader arm for spreading said material and means mounting said arm for movement from a working position relative to said floor to an idle position above said tank, the latter having an open upper portion to receive material gravitating from said spreader arm in said idle position.

3. An apparatus for refinishing floors and including a truck, a tank tiltably secured to said truck and having discharge openings positioned to discharge material onto the floor when the tank is tilted into an operative position and to prevent said discharge when the tank is tilted into an inoperative position, means for tilting said tank into and out of said positions, a spreader arm and means pivotally mounted on said truck and supporting said arm for movement between an idle position and an operative position relative to said floor for spreadably working the material discharged by said tank, and means on said truck to limit movement of said arm into said idle position so as to overly said tank, the latter having a portion open to receive drippings from said spreader arm in said idle position.

4. Floor treating apparatus comprising a truck, an elongated tank and means mounting the same in a projected position beyond one end of said truck and with the length of the tank lateral to the general travel of the truck, said tank having discharge openings for treating material carried thereby and further having open top portions, an elongated spreader for treating material and means mounting said spreader on said truck in approximate parallelism with said tank and for movement relative to the latter into and out of an idle position in alignment above said open top portions of the tank and a working position below the level of said tank and on said floor.

5. Floor treating apparatus including a roller truck, an elongated treating arm pivotally mounted by means attached to said truck so as to extend crosswise of the general axis of travel of the truck, the pivotal movement of said arm being between an idle elevated position and a lowered working position on said floor, and a treating-material discharge tank approximately coextensive in length with said treating arm and carried by said truck in a position of approximate parallelism with said treating arm and at a level intermediate of said idle and working positions of the latter.

6. Apparatus as defined in claim 5 and further characterized in that said tank has open upper portions underlying said treating arm to receive drippings from the latter in said idle position thereof.

7. A floor treating machine comprising a truck, an elongated discharge tank for treating material and means mounting said tank in advance of an end of the body of the truck to overly the floor, said tank being movably supported by said mounting means for motion into and out of a discharging and a non-discharging position, discharge exit means in said tank for discharge of treating material therein substantially along the length of said tank when the latter is in said discharging position and to prevent such discharge when the tank is in said non-discharging position, an elongated surfacing member mounted on arms carried by said mounting means to swing from idle position above said tank to a working position engaging said floor, and lever means carried by said truck and having connection with said tank for operation to move the tank into and out of said discharging and non-discharging positions.

8. A machine as set forth in claim 7 and further characterized in that said tank is hingedly mounted on said mounting means to rock into and out of said discharging and non-discharging positions, and said exit means comprises a plurality of discharge holes along an upper longitudinal margin of said tank so as to be disposed at a higher level than the treating material in the tank when the latter is in said non-discharging position, and to be disposed at a lower level than said treating material when the tank is in said discharging position.

9. A floor treating machine comprising an elongated tank and a similarly elongated spreader arm, means pivotally mounting said tank and arm in approximate parallelism for relative motion with said tank movable into and out of working and idle position, and said spreader arm movable into and out of working and idle position, means along the length of said tank for discharging treating material from the tank when the latter is in working position, and a wheeled vehicle carrying said mounting means with said tank and spreader arm spaced from the vehicle to overly the floor, and said spreader arm movable from idle position to working position on the floor.

JOSEPH LOMBARDO.

REFERENCES CITED

The following references are of record in the file of this patent:

UNITED STATES PATENTS

| Number | Name | Date |
|---|---|---|
| 209,185 | Nye | Oct. 22, 1878 |
| 1,268,524 | Wilson | June 4, 1918 |
| 1,560,445 | Wagner | Nov. 3, 1925 |
| 1,818,916 | Wasen | Aug. 11, 1931 |
| 1,961,518 | Larkin | June 5, 1934 |
| 2,036,115 | Branch | Mar. 31, 1936 |
| 2,162,310 | Korsen | June 13, 1939 |